United States Patent [19]

Kohara et al.

[11] 4,309,082
[45] Jan. 5, 1982

[54] ELECTROCHROMIC DISPLAY APPARATUS

[75] Inventors: Rikusei Kohara, Ibaraki; Yoshihisa Komoto, Settsu; Seizo Nakajima, Takatsuki, all of Japan

[73] Assignee: Matsushita Electric Industrial Co., Ltd., Osaka, Japan

[21] Appl. No.: 90,919

[22] Filed: Nov. 5, 1979

Related U.S. Application Data

[63] Continuation of Ser. No. 811,882, Jun. 30, 1977, abandoned.

[30] Foreign Application Priority Data

Jul. 12, 1976 [JP] Japan .................................. 51-83144
Jul. 13, 1976 [JP] Japan .................................. 51-83647

[51] Int. Cl.³ .............................................. G02F 1/17
[52] U.S. Cl. ...................................... 350/357; 340/785
[58] Field of Search .................. 350/357; 340/763, 785

[56] References Cited

U.S. PATENT DOCUMENTS

| | | | |
|---|---|---|---|
| 3,912,368 | 10/1975 | Ponjee et al. ........................ | 350/357 |
| 3,950,936 | 4/1976 | Oguey et al. ........................ | 350/357 X |
| 3,961,842 | 6/1976 | Jasinski ............................... | 350/357 |
| 4,117,475 | 9/1978 | Ebihara et al. ..................... | 350/357 X |

OTHER PUBLICATIONS

Schoot et al., "New Electrochromic Memory Display", *Appl. Phys. Lett.*, vol. 23, No. 2, 15 Jul. 1973, pp. 64–65.
Schoot et al., "An Electrochromic Display with Memory", 1973, *Symposium on Image Display*, Technical Paper, pp. 146–147.

*Primary Examiner*—James W. Davie
*Attorney, Agent, or Firm*—Cushman, Darby & Cushman

[57] ABSTRACT

In a container which contains an electrochromic solution, a pair of electrodes, namely an indication electrode and a counter-electrode are disposed and an electric circuit is constituted in a manner such that a D.C. pulse is impressed across the electrodes and thereafter the electrodes are shortcircuited to each other. By means of the shortcircuiting, a color indicating substance formed on the indication electrode by the electrochemical reduction reaction or electrochemical oxidation reaction is reversably dissolved from the indication electrode into the solution so as to erase the indication, and therefore contamination of the indication electrode is less and hence a longer life is achieved in comparison with conventional apparatus where such shortcircuiting is not made and simply an inverse pulse is impressed across the electrodes for erasing.

9 Claims, 5 Drawing Figures

ELECTROCHROMIC DISPLAY APPARATUS

This is a continuation of application Ser. No. 811,882, filed June 30, 1977, now abandoned.

BACKGROUND OF THE INVENTION

This invention relates to electrochromic display apparatuses and particularly concerns electrochromic display apparatus employing an electrochemical reaction.

The electrochromic display apparatuses are expected to have a bright future since the color of indication is brilliant, necessary voltage and current are small and there is no restriction in the observation angle. However hitherto, the life of the electrochemical display apparatus have not been satisfactorily long.

The electrochromic display apparatuses are divided into two groups, namely, physical type electrochromic display apparatuses and electrochemical type electrochromic display apparatuses. Each of the groups are further divided into an inorganic type and an organic type. Electrochromic substances used in the abovementioned various types of apparatus are shown in the Table 1 below.

TABLE 1

| types | | electrochromic substance |
| --- | --- | --- |
| Physical type electrochromic apparatuses | inorganic | WO$_3$, MoO$_3$, TiO$_2$ |
| | organic | metanitroanilins, merocyanine dyes such as indophenol blue. |
| Electrochemical type electrochromic apparatuses | inorganic | ions of metal (Ag$^+$, Na$^+$), ions of non-metal (I$^-$), polytungsten-anions. |
| | organic | viologen compounds such as hexyl viologens, heptyl viologens, octyl viologens, benzyl viologens; redox dyes such as leucodyes and tetraalkyl-p-arylenediamines; PH indicators such as phenolphthalene, phenol red, cresol red. |

Among the abovementioned listed electrochromic display apparatuses, the apparatuses of the electrochemical type make use of the change of light absorption or light reflection of the substance formed on an indication electrode by the electrochemical reaction of oxidation or reduction of the electrochromic substance.

A typical example of the prior art devices of the electrochromic display apparatus of the elctrochemical type is elucidated referring to FIG. 1, which is a circuit diagram of the apparatus of the prior art, and FIG. 2 which shows a voltage wave form of pulses to be impressed across the electrodes 1 and 2.

As shown in FIG. 1, in a container 4, for example, of glass, which contains electrochromic substance 3 or solution in the liquid phase, gel phase or solid phase, a pair of chemically stable electrode, namely, an indication electrode 1 and a counter-electrode 2 are disposed with a specified gap inbetween. Therefore, the gap between the electrodes 1 and 2 is filled with the electrochromic solution 3. The electrodes 1 and 2 are connected to a D.C. power source 5 through a polarity inversing switch 6. By impressing a D.C. voltage 7 shown in FIG. 2 of a polarity selected by the switch 6, for a specified time periode on the electrodes 1 and 2, cations A$^+$ and anions B$^-$, respectively, which have been produced by a dissociation shown by the belowmentioned reaction formula (1) of a electrochromic substance AB, there results a reduction reaction of the belowmentioned reaction formula (2) at the cathode and an oxidation reaction of the belowmentioned reaction formula (3) at the anode, respectively.

$$AB \rightarrow A^+ + B^- \qquad (1)$$

$$A^+ + e^- \rightleftharpoons A \qquad (2)$$

$$B^- - e^- \rightleftharpoons B \qquad (3).$$

Accordingly, reduction product A onto the cathode and oxidation product B onto the anode, respectively are formed.

The polarity of the voltage impressed on the electrodes are selected in a manner that, when the reduction product A is used for the indication, then the indication electrode is connected as the cathode and, when the oxidation product B is used for the indication, then the indication electrode is connected as the anode. By opening the polarity inversing switch 6 after the preset time, the redox reaction stops and the reduction product A and the oxidation product B are retained on the abovementioned respective electrodes. Then, by inversely connecting the inversing switch 6 after a preset time period, an inverse polarity voltage 8 shown in FIG. 2 is impressed on the electrode, and the reverse reaction takes place, thereby forming A$^+$ cations from the reduction product A and B$^-$ anions from the oxidation product B and dissolving them from the electrodes, and resultantly, the indication is erased.

In such a conventional electrochemical electrochromic display apparatus, as described in the above, the pulses impressed on the electrodes 1 and 2 have the positive writing pulse 7 and the negative erasing pulse 8. Since the voltage of each electrode is inversed at every writing-in and erasing-off, the reduction product A and the oxidation product B are alternately produced and dissolved on the same indication electrode 1. Since some small amounts of the reaction products are remaing on the indication electrode, both remaining products may coexist on the electrode. Such a reduction product A and the oxidation product B are generally liable to chemical reaction with each other as shown by the belowmentioned irreversible reaction formula (4), and therefore, such a series of the impressing of the alternate polarity of pulses is likely to form an undesirable irreversible reaction product C deposited on the indication electrode.

$$A + B \rightarrow C \qquad (4).$$

Such a reaction product C coats and contaminates the surface of the indication electrode thereby causing an increase in the resistance of the apparatus. Therefore, the reactions of reduction and oxidation at the electrode surface are hindered thereby adversely effecting normal electrochemical electrochromic operation of the apparatus.

SUMMARY OF THE INVENTION

The object of the present invention is to eliminate the abovementioned undesirable depositing of irreversible reaction product coating the electrodes, thereby considerably decreaseing contamination of the electrode surface and increase the life of the apparatus.

BRIEF EXPLANATION OF THE INVENTION

DETAILED DESCRIPTION OF THE PRESENT INVENTION

Figure 1:
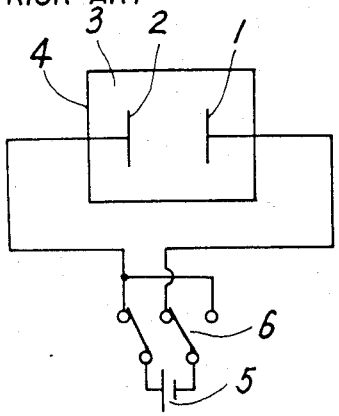
FIG. 1 is a circuit diagram of an example of a conventional electrochemical electrochromic display apparatus of the present invention.
Figure 2:
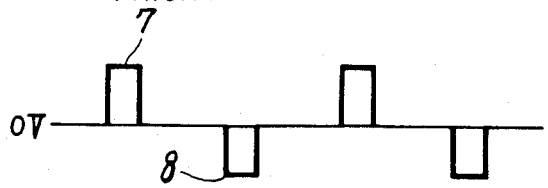
FIG. 2 is a waveform chart showing writing-in pulses 7 and erasing-off pulses 8 to be impressed across the electrodes of the apparatus of FIG. 1.
Figure 3:
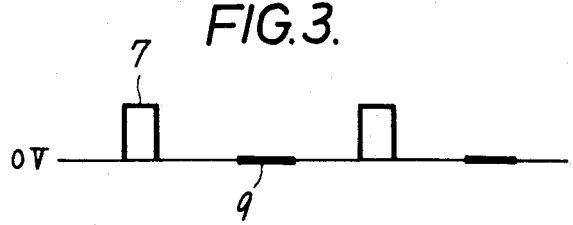
FIG. 3 is a waveform chart showing writing-in pulses 7 to be impressed across the electrodes and erasing shortcircuitings 9 of the electrodes of an example of a electrochemical electrochromic display apparatus embodying the present invention.

The present invention is elucidated referring to the Figures of FIG. 3 and thereafter.

FIG. 3 shows one example of the state of the voltage of the electrodes 1 and 2.

Figure 4:
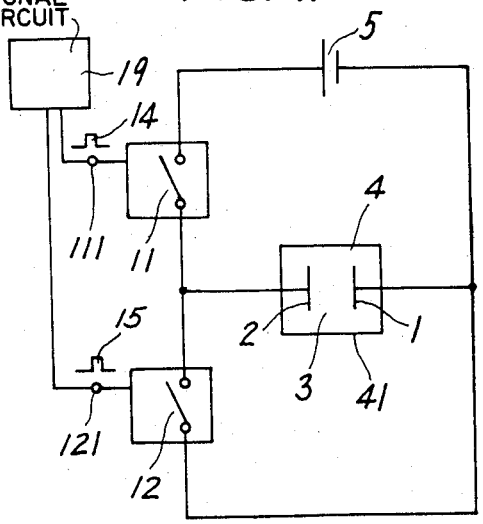
FIG. 4 is a circuit diagram of the example, the waveform chart of which is shown in FIG. 3.

FIG. 4 shows an example of the electrochromic display apparatus. In FIG. 4, a container 4, for example, of glass contains electrochromic substance 3 of solution in the liquid phase, gel phase or solid phase. A pair of chemically stable electrodes, namely, an indication electrode 1 and a counter-electrode 2 are disposed with a specified gap inbetween. Namely the gap between the indication electrode 1 and the counter-electrode is filled with the electrochromic substance 3. The electrodes 1 and 2 are connected to a D.C. power source 5 through a switching circuit 11. A shortcircuiting circuit 12 is connected across the electrodes 1 and 2. The switching circuit 11 and the shortcircuiting circuit 12 have input terminals 111 and 121 and are made "ON" when control signals 14 and 15 from a controlling circuit 19 are impressed on the terminals 11 and 12, respectively.

The feature of the present invention is that, after an impressing of a D.C. pulse across the electrodes of the electrochemical electrochromic apparatus for writing-in of the indication, the erasing of the indication can be made by shortcircuiting the electrodes to each other.

Namely, a positive pulse 7 for writing is impressed on one of the electrode, for example, the indication electrode 1, with respect to the other electrode. The impressing of the positive pulse 7 is made by closing a switch 11 which is connected in series with a D.C. power source 5 for a specified preset time period. By means of this impression of the pulse 7, an indication is written in to change the color of the indication electrode. Then, the written-in indication is erased by shortcircuiting the electrodes for a preset time period as indicated by a short line 9 on the zero volt line in FIG. 3. Such shortcircuiting for an erasing is the important feature of the present invention.

Theory: As a result of the products of the reduction reaction and the oxidation reaction, these products are deposited on the surface of the electrodes. By deposition of different substances on the first and the second electrodes, the cell consisting of the pair of electrodes and the electrochromic solution form a battery, wherein an electromotive force is necessarily generated across the electrode. Therefore, during the indication being made, such an electromotive force exists. Accordingly, when both electrodes are shortcircuited with each other, a discharging takes place by means of the electromotive force, and the discharging makes the deposited reduction product A and the oxidation product B disolve into the electrochromic solution returning into cations and anions $A^+$ and $B^-$, respectively, by means of reverse reactions (from right side to left side) of the reaction formulae (2) and (3), respectively. Therefore, the written indication is erased without impressing an inverse voltage pulse which has been hitherto used.

By the abovementioned shortcircuiting, reduction product A or the oxidation product B deposited during the indication is entirely removed. Therefore, in the conventional electrochromic apparatus, there is no undesirable hitherto observed reaction that a part of the reduction product A or the oxidation product B, deposited for the indication and remaining thereafter on the indication electrode, reacts with opposite reaction product, namely, the oxidation product B or the reduction product A deposited by an impression of opposite voltage for erasing.

In other words, in the apparatus of FIG. 4, when the substance used for the indication is the reduction product A, the operation of the indication electrode is always as a cathode and that of the counter-electrode is always as an anode; when the substance used for the indication is the oxidation product B, the operation of the indication electrode is always as an anode and that of the counter-electrode is always a cathode. Therefore, each electrode has deposition of either one of the reaction products A or B only for writing the indication in, and hence, there is no possibility of forming undesirable deposition on the indication electrode by means of the abovementioned irreversible reaction of the formula (4). As the counter-electrode a polarizable electrode material such as gold or platinum is used.

It is of course necessary that the conditions of the writing-in pulse, namely, voltage, polarity and duty time (i.e., pulse width) should be selected according to known procedures so as to meet the reduction and oxidation potentials of the electrochromic substance used. Such selection is for achieving procedures the desired optical density of the indicated color and to prevent generation of an adverse side reaction such as producing a gas. The pulse shape is not limited to the square wave, but a triangular wave, a saw tooth wave, a half cycle of sine wave, etc., can be used.

The shortcircuiting for the erasing can be made directly across the electrodes to each other, or indirectly through the grounding of both electrodes. The necessary time period i.e., time width of the short circuiting time, varies depending on the optical density of the indicated color to be erased and circuit resistance of the circuit including the cell and the switching means. The higher the optical density and the circuit resistance are, the longer the necessary shortcircuiting time period is. If an excessively long time period for erasing is necessary, the apparatus has an unsatisfactory response characteristic for erasing. Therefore, it is recommended to use an electrochromic cell having a characteristic such that a perfect erasing is made with shortcircuiting of a time period within 20 times of that for the writing pulses.

According to the operation including shortcircuiting in accordance with the present invention, the deposition of an undesirable contaminating substance to the electrodes due to the simultaneous existence of the reduction product and the oxidation product is satisfactorily prevented. However, after many cycles, for example, 5,000 to 100,000 cycles, of writing-in and erasing-off of the indication, a very small amount of deposition of the reduction product or the oxidation product may take place. In order to remove such a small amount of the deposited substance, it is useful to impress a pulse of the inverse polarity after the series of 5,000 to 100,000 cycles of writing-in and erasing-off.

Construction of the apparatus: FIG. 4 shows an example of the mechanical and electrical construction of the electrochromic display apparatus in accordance with the present invention. The cell comprises a transparent or translucent container 41, an electrochromic solution 3 contained in the container, an indication electrode 1 and a counter-electrode 2. The indication electrode 1 and the counter electrode 2 are connected to the negative terminal and the positive terminal of a D.C. power source, through a switching circuit 11, which is made "ON" during receiving a writing-in signal 14 at its input terminal 111. A pair of output terminals of a shortcircuiting circuit 12, which shortcircuits the output terminal during receiving of an erasing-off signal 15 at its input terminal 11, is connected across the indication electrode 1 and the counter-electrode 2. For the switching circuit 11 and the shortcircuiting circuit 12, any of mechanical relays, electronic relay circuits such as transistor switching circuit, mercury relays, etc., can be used.

The writing-in of the indication in the apparatus of FIG. 4 is made by impressing the writing-in signal 14 to the input terminal 111, thereby impressing a writing-in pulse 7 of FIG. 3 to the indication electrode 1. The erasing-off is made by impressing the erasing-off signal 15 to the input terminal 12 input terminal 121, thereby shortcircuiting the electrodes 1 and 2 to each other as shown by the line 9 of FIG. 3. The writing-in signal 14 and the erasing-off signal 15 are generated by a controlling signal circuit 19.

Figure 5:
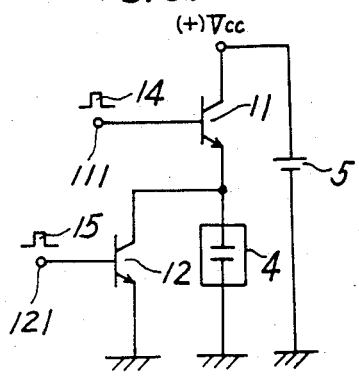
FIG. 5 is more concise circuit diagram of the apparatus of FIG. 4.

FIG. 5 shows an actual example of the circuit of the electrochromic display apparatus shown in FIG. 4. The switching circuit consists of an n-p-n transistor 11 and the shortcircuiting circuit consists of another n-p-n transistor 12. The transistors 11 and 12 are made "ON" during receiving input signals 14 and 15 at their base and writes in and erases off the indication, respectively.

For the electrochromic substance of the apparatus in accordance with the present invention, one of the metal ions, non-metal ions, polytungsten anions, viologen compounds, or redox dyes are usable. Especially, among the abovementioned substances, hexyl viologens, heptyl viologens, octyl viologens and benzyl viologens are satisfactory for practical use, since these viologens have the characteristic that, from $-10°$ C. to $+70°$ C., the abovementioned shortcircuiting time period necessary for erasing the indication is less than 10 times of the writing-in time period. For example, the erasing time period is less than 1 second against 100 ms (milli-second) of the writing-in time period.

EXAMPLE 1

Electrochromic aqueous solution contains:

| heptyl viologen bromide | 0.1 mol/l, |
|---|---|
| potassium bromide as supporting electrolyte | 0.3 mol/l. |

Indication electrode 1 and counter-electrode 2: a pair of platinum electrodes disposed with a 2 mm gap inbetween.

Writing-in pulse across the electrodes:

| pulse width | 100 milli seconds, |
|---|---|
| voltage | 2 volts. |

Erasing-off: by shortcircuiting for 500 milli seconds.

Life test run of writing-in and erasing-off: at the rate of 1 cycle per second.

In the abovementioned life test run, no contamination on the indication electrode is observed even after 5,000 cycles of the writing-in and the erasing-off; while under the conventional way of erasing by means of impressing 2 volts inverse voltage, the indication electrode becomes noticeably contaminated by the irreversible product, so that normal indications are not made after only 5,000 cycles of writing-in and erasing-off.

EXAMPLE 2

Electrochromic aqueous solution: same as of the Example 1.

Indication electrode 1 and counter-electrode 2: a pair of gold electrodes disposed with a 2 mm gap inbetween.

Writing-in pulse across the electrodes:

| pulse width | 100 milli seconds, |
|---|---|
| voltage | 2 volts. |

Erasing-off: by shortcircuiting for 500 milli seconds.

Life test run of writing-in and erasing-off: at the rate of 1 cycle per 2.5 second (0.4 cycle per second).

In the above mentioned life test run, no contamination on the indication electrode is observed and the apparatus works still satisfactory even after 1,000,000 cycles of the writing-in and the erasing-off; while under the conventional way of erasing by means of impressing 2 volts inverse-voltage, the indication electrode becomes noticeably contaminated by the irreversible product so that normal indications are not made after only 5,000 cycles of writing-in and erasing-off.

EXAMPLE 3

Electrochromic aqueous solution: same as of the Example 1.

Indication electrode 1: a platinum electrode.

Counter-electrode 2: a gold electrode disposed with a 2 mm gap from the indication electrode 1.

Writing-in pulse across the electrodes:

| pulse width | 200 milli seconds, |
|---|---|
| voltage | 2 volts. |

Erasing-off: by shortcircuiting for 300 milli seconds.

Life test run of writing-in and erasing-off: at the rate of 1 cycle per second.

In the abovementioned life test run, no contamination on the indication electrode is observed even after 1,000,000 cycles of the writing-in and the erasing-off; while under the conventional way of erasing by means impressing 2 volts inverse voltage, the indication electrode becomes noticeably contaminated by the irreversible product so that normal indication are not made after only 5,000 cycles of writing-in and erasing-off.

EXAMPLE 4

Electrochromic aqueous solution: same as of the Example 1.

Indication electrode 1 and counter-electrode 2: same as of the Example 3.

Writing-in pulse across the electrodes: same as of the Example 3.

Erasing-off: by shortcircuiting for 100 milli second.

This example was intentionally made shorter than that of Ex. 3 in order to realize incomplete erasing and slight accumulation of the reduction product on the indication electrode.

Life test run of writing-in and erasing-off: at the rate of 1 cycle per second, but including impressing of inverse-voltage, pulse of 2 volts 300 milli seconds across the electrode after every 5,000 cycles of writing-in and erasing-off.

In the abovementioned test run, reduction product accumulated due to insufficient erasing on the surface of the indication electrode 1 is entirely oxidized and cleaned out at every impression of the abovementioned inverse voltage pulse. No contamination on the indication electrode is observed at all even after 3,000,000 cycles in total of the writing-in and the erasing-off according to the test run of this example.

As elucidated in detail with respect to the foregoing examples, in the apparatus of the present invention, there is no sequence of impressing pulses of opposite polarity. The erasing of the written indication is made by shortcircuiting the electrodes, which may be followed by an impression of an inverse voltage pulse. Or in the other example, a shortcircuiting between the electrodes anticipates each impressing of the pulses. Namely, the surface of the indication electrode is cleaned before each impressing of the pulse across the electrodes. Accordingly, there is no undesirable production of irreversible product on the indication electrode, and hence the indication electrode can be kept clean for longer life time, for example in some cases more than 100 times longer than those of the prior art devices.

In the case more than two electrochromic substances, which do not chemically react with each other, are contained in the solution, the electrochromic indication on the indication electrode becomes a mixed indication of these two electrochromic substances. Therefore, if desired a mixed color of these substances is obtainable.

What we claim is:

1. An electrochromic display apparatus comprising:
   (a) a display cell having an indication electrode, a polarizable counter-electrode and an electrochemical electrochromic substance filled between said indication electrode and said counterelectrode,
   (b) a voltage-impressing means for impressing a predetermined voltage across said indication electrode and said counter-electrode for a predetermined time period to allow a current to flow across the electrodes to form an electrochromic reaction product for electrochromic indication on the surface of said indication electrode, and
   (c) a shortcircuiting means which, each time before applying said predetermined voltage, shortcircuits said indication electrode and said counter-electrode to each other for a predetermined time period to provide an inverse current to said current across the electrodes to dissolve said electrochemical reaction product and thereby erase said electrochromic indication.

2. The electrochromic display apparatus of claim 1 wherein said counterelectrode is gold or platinum.

3. In a method of operating an electrochemical electrochromic display apparatus comprising a display cell having an indication electrode, a counter-electrode and an electrochemical electrochromic substance filled between said counter-electrode and said indication electrode,
   the improvement comprising the steps of:
   (a) impressing a predetermined voltage across said indication electrode and a polarizable counter-electrode for a predetermined time period to allow a current to flow across the electrodes to form at least an electrochemical reaction product for electrochromic indication on the surface of said indication electrode, and
   (b) each time before applying said predetermined voltage shortcircuiting said indication electrode and said counter-electrode to each other for a predetermined time period making an inverse current to said current across the electrodes, dissolving said reaction product and thereby erasing said electrochromic indication.

4. An electrochromic display apparatus comprising:
   (a) a display cell having an indication electrode, a Pt or Au counter-electrode and an electrochemical electrochromic substance filled between said indication electrode and said counter-electrode,
   (b) a voltage-impressing means for impressing a predetermined voltage across said indication electrode and said counter-electrode for a predetermined time period to allow a current to flow across the electrodes to form an electrochromic reaction product for electrochromic indication on the surface of said indication electrode, and
   (c) a shortcircuiting means which, each time before applying said predetermined voltage, shortcircuits said indication electrode and said counter-electrode to each other for another predetermined time period to provide an inverse current to said current across the electrodes to dissolve said electrochemical reaction product and thereby erase said electrochromic indication.

5. An electrochromic display apparatus in accordance with claim 4, wherein said electrochemical electrochromic substance is an aqueous solution containing at least one compound selected from the group consisting of hexyl viologen compounds, heptyl viologen compounds, octyl viologen compounds and benzyl viologen compounds.

6. The electrochromic display apparatus of claim 4, wherein said another predetermined time period is from 1–20 times long as said predetermined time period.

7. A method of operating an electrochemical electrochromic display apparatus including a display cell having an indication electrode, a counter-electrode and an electrochemical electrochromic substance filled between said counter-electrode and said indication electrode, said method comprising the steps of:
   (a) impressing a predetermined voltage across said indication electrode and a Pt or Au counter-electrode for a predetermined time period to allow a current to flow across the electrodes to form at least an electrochemical reaction product for electrochromic indication on the surface of said indication electrode, and
   (b) each time before applying said predetermined voltage short-circuiting said indication electrode and said counter-electrode to each other for another predetermined time period making an inverse current to said current across the electrodes, dissolving said reaction product and thereby erasing said electrochromic indication.

8. The method of claim 7, wherein said electrochemical electrochromic substance is an aqueous solution containing at least one compound selected from the group consisting of hexyl viologen compounds, heptyl viologen compounds, octyl viologen compounds and benzyl viologen compounds.

9. The method of claim 7, wherein said another predetermined time period is as 1-20 times long as said predetermined time period.

* * * * *